United States Patent
Yamazaki

[11] 4,026,637
[45] May 31, 1977

[54] TIMEPIECE DISPLAY DEVICE UTILIZING LIQUID CRYSTALS OF POSITIVE DIELECTRIC ANISOTROPY

[75] Inventor: Yoshio Yamazaki, Shimosuwa, Japan

[73] Assignee: Kabushiki Kaisha Suwa Seikosha, Tokyo, Japan

[22] Filed: Feb. 13, 1976

[21] Appl. No.: 658,138

Related U.S. Application Data

[63] Continuation-in-part of Ser. No. 472,749, May 22, 1974, abandoned, which is a continuation-in-part of Ser. No. 184,167, Sept. 27, 1971, Pat. No. 3,816,334.

[52] U.S. Cl. .......................... 350/160 LC; 350/150
[51] Int. Cl.² ............................................. G02F 1/13
[58] Field of Search ..................... 350/150, 160 LC

[56] References Cited

UNITED STATES PATENTS

| | | | |
|---|---|---|---|
| 3,248,165 | 4/1966 | Marks et al. | 350/144 |
| 3,881,809 | 5/1975 | Fergason et al. | 350/160 LC |
| 3,960,438 | 6/1976 | Bonne | 350/160 LC |

*Primary Examiner*—Edward S. Bauer
*Attorney, Agent, or Firm*—Blum, Moscovitz, Friedman & Kaplan

[57] ABSTRACT

A timepiece display device utilizes liquid crystals of positive dielectric anisotropy in a transparent cell having transparent electrodes on the interior surfaces of the cell walls. The device includes a polarizing filter and an analyzing filter at opposite faces of the cell and a mirror for reflecting light back through the cell in an arrangement which increases the intensity and contrast of the display.

7 Claims, 5 Drawing Figures

TIMEPIECE DISPLAY DEVICE UTILIZING LIQUID CRYSTALS OF POSITIVE DIELECTRIC ANISOTROPY

CROSS REFERENCE TO RELATED APPLICATION

This application is a continuation-in-part application of applicant's application Ser. No. 472,749, filed May 22, 1974, and now abandoned, the latter being a continuation-in-part of applicant's application No. 184,167, now U.S. Pat. No. 3,816,334.

BACKGROUND OF THE INVENTION

Liquid crystal materials have been known for a long time, but recently have been studied intensively as it has become apparent that their unique properties can be put to a variety of practical uses. The liquid crystal materials possess the fluidity of liquids together with the optical anisotropy of solids. The anisotropy which, in certain varieties of the materials, can produce optical rotation, is susceptible to alteration by imposition of electric or magnetic fields. Display devices are known which take advantage of this change in optical rotatory power as the result of imposition of a field.

In conventional liquid crystal displays, light-scattering is produced in nematic liquid crystals by means of transport of ions under the influence of an electric field; the liquid crystals used for this purpose are termed nematic and are of negative dielectric anisotropy.

Liquid crystals are classified as smectic, cholesteric and nematic. Nematic liquid crystals utilized in electro-optical displays are further subdivided into those having positive and those having negative dielectric anisotropy. Where the nematic liquid crystal has positive dielectric anisotropy, the direction of the dipole moment of the liquid crystal molecule is along the macro-axis of the molecule; where the nematic liquid crystal is of negative dielectric anisotropy, the dipole moment is at right-angles to the macro-axis of the molecule. In the conventional liquid crystal display device, dynamic scattering caused by movement of ions under the influence of an electric field disturbs the ordered arrangement of the liquid crystal molecules and results in light-scattering. When a cell containing a liquid crystal of negative dielectric anisotropy is backed up with a black background, and the cell is viewed by ambient light, then imposition of an electric field on selected portions of the cell causes these portions to appear bright against a dark background. For this type of display, the more negative the dielectric anisotropy of the liquid crystal compound, the more effective the display will be.

The following table presents examples of liquid crystal compounds of both positive and negative dielectric anisotropy.

| NEMATIC LIQUID CRYSTAL MATERIALS | |
|---|---|
| Type of Dielectric Anisotropy | Liquid Crystal Compounds |
| Negative | p-azoxyanisole (PAA) |
| | Anisylidene-p-amylphenylacetate (APAPA) |
| | p-methoxybenzylidenebutylaniline (MBBA) |
| Positive | p-butoxybenzylidene-p'-aminobenzonitrile |
| | p-ethoxybenzylidene-p'-aminobenzonitrile |

The conventional method of using nematic liquid crystal materials having positive dielectric anisotropy is to place them between transparent plates each having at least one transparent electrode on the interior surface thereof, the plates each having been oriented as by unidirectionally rubbing with a material such as gauze, cotton-wool or the like, Other methods of orienting the surface are also well-known. The plates are then mounted so that the directions of orientation are at right-angles to each other. Under such conditions, when liquid crystal material of positive dielectric anisotropy is placed in the cell formed by the opposed plates, the molecules immediately adjacent the plates align themselves with the orientation directions. The molecules intermediate the plates align themselves along a helix making a quarter turn from one plate to the other. As a result, linearly-polarized light passing through the cell is rotated through an angle of 90°. However, if an electric field of sufficient strength is imposed across the cell in a direction parallel to the axis of the helix, the molecules align themselves with the electric field and the optical rotatory power of the cell disappears.

As is evident, to make use of the phenomenon of the dependence of optical rotatory power on the presence or absence of an electric field, it is necessary that polarizer and analyzer plates be used in conjunction with the cell and with the liquid crystal material therein. Such polarizer and analyzer plates must absorb a substantial proportion of the light falling thereon, especially when the system is used as a display device which must be traversed twice by ambient light, as is the case when the display is used by reflected light. The absorption of the light degrades both the overall intensity of the display as well as the contrast thereof. Moreover, since a mirror must be used for reflection of the light back through the cell, it is generally found that a double image is generated, the second image being fainter than the principal image. The double image arises from the fact that the mirror is a separate element in the assembly. It is evident, therefore, that a cell construction which provides a more legible display over a wider range of ambient light intensities, and which is free of a double image would be of substantial advantage.

SUMMARY OF THE INVENTION

A timepiece display device in accordance with the present invention includes a cell constructed of opposing transparent plates, each having at least one transparent electrode on the interior surface thereof, the electrodes being connectable to an exterior source of voltage in such a way that an electric field can be imposed across selected portions of the cell. The cell plates have been unidirectionally oriented on the interior surfaces thereof and the plates mounted opposite each other so that the orientation directions on the two plates ar eperpendicular to each other. Between the two plates is placed a liquid crystal material of positive dielectric anisotropy, as a result of which the cell has the power to rotate linearly polarized light through an angle of 90° as the light transits the cell. A polarizing filter is placed against one face of the cell and an analyzing filter is placed against the opposite face of the cell, the exterior surface of the analyzing filter being a diffusing surface. Further, a mirror is positioned in contiguity at the exterior face of the analyzing filter to reflect back through the cell such light as has penetrated the cell, the surface of the mirror being such that specular reflection is avoided. The purpose is to increase the intensity and contrast of the display.

Accordingly, an object of the present invention is a timepiece display device of high legibility utilizing liquid crystals of positive dielectric anisotropy.

Another object of the present invention is a timepiece display device of high legibility utilizing liquid crystals of positive dielectric anisotropy in combination with a polarizing filter and an analyzing filter for controlling the intensity of light passing through the device.

A further object of the present invention is a timepiece display device of high legibility wherein a mirror which is contiguous with a diffusing surface is used in combination with polarizing and analyzing filters and a cell, the optical rotatory power of which is controlled by imposition of an electric field on selected segments thereof, for enhancing the intensity of the display.

An important object of the present invention is a timepiece display device of high legibility wherein a mirror is used but which nevertheless is free of a double image.

Still other objects and advantages of the invention will in part be obvious and will in part be apparent from the specification.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWING

For a fuller understanding of the invention, reference is had to the following description taken in connection with the accompanying drawings, in which.

DESCRIPTION OF THE PREFERRED EMBODIMENTS

Figure 1:
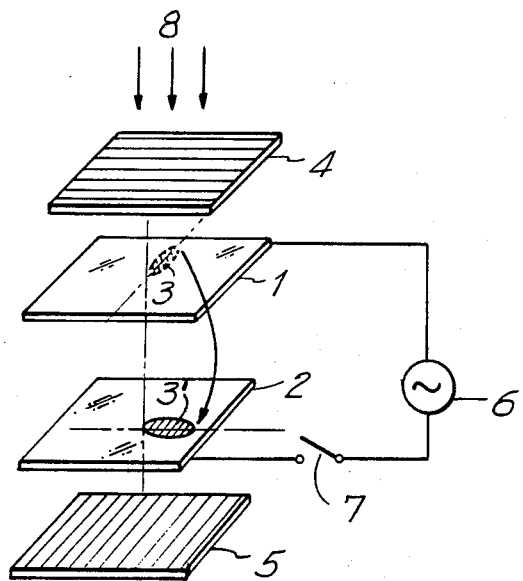
FIG. 1 illustrates the way in which a helix is formed of liquid crystals of positive dielectric anisotropy between unidirectionally oriented plates mounted so that the directions of orientation are at right-angles to each other.

FIG. 1 shows schematically in exploded view a quarter-turn helix formed between plates 1 and 2 of a liquid crystal cell. The plates have each been unidirectionally oriented and the mounting directions of plates 1 and 2 are such that the orientation directions are perpendicular to each other. A liquid crystal molecule having positive dielectric anisotropy is given the reference numeral 3 and is shown as being aligned in a horizontal direction, whereas a liquid crystal molecule 3' at the surface of plate 2 is aligned in a direction perpendicular to that of molecule 3. Electrodes, (not shown) on the inner surfaces of plates 1 and 2 are connected to a source of voltage 6 through switch 7. The cell formed by plates 1 and 2 has a polarizing filter 4 at one face thereof and an analyzing filter 5 at the other face thereof. Light 8 is shown as being directed toward the exterior surface of plate 4. In the Figure the polarization axes of polarizing filter 4 and analyzing filter 5 are at right angles to each other. However, the arrangement in which the axes of the polarizing filter and the analyzing filter are parallel to each other is also useful.

When the polarization axes of the polarizing and analyzing filters are at right-angles to each other then, in the absence of an electric field, light passes through the entire system since the cell rotates the plane of the polarized light by 90°. In the presence of an electric field of sufficient strength (usually a few volts) the optical activity of the cell disappears in that part across which there is an electrical field of sufficient strength and no light traverses that part of the system.

When the axes of polarizing filter 4 and analyzing filter 5 are parallel to each other, then, in the absence of an electric field, no light traverses the system. However, when an electric field of sufficient strength is imposed across the cell, or, more specifically, between electrodes on opposite faces of the cell, then the optical activity of the cell is eliminated and light traverses that part of the system between opposed electrodes.

Figure 2:
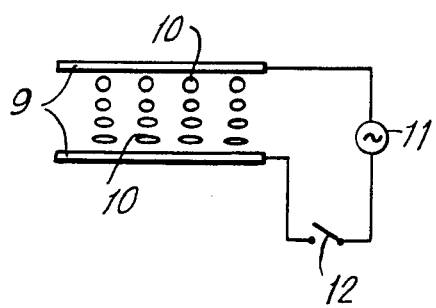
FIGS. 2 and 3 show diagrammatically the orientation of liquid crystal molecules in the absence and presence, respectively, of an electric field.
Figure 3:
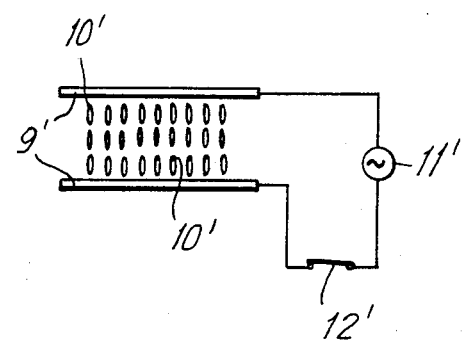

The arrangement of molecules of liquid crystals having positive dielectric anisotropy, in the absence of an electric field, is shown schematically in FIG. 2, and in the presence of an electric field is shown schematically in FIG. 3. The reference numerals 9 and 9', represent respectively, the transparent electrodes on the inner surfaces of the cell walls. Reference numerals 10 and 10' represent respectively liquid crystal molecules in the absence of and the presence of an electric field, said field being imposed by voltage source 11' when switch 12' is closed. The change in orientation of the liquid crystal molecules with distance from the plates is represented schematically in FIG. 2 by the alteration in the shape of the molecules as viewed from an edge of the cell.

The alignment of the molecules in the presence of an electric field of sufficient strength, and consequent elimination of optical activity is shown schematically in FIG. 3.

Figure 4:
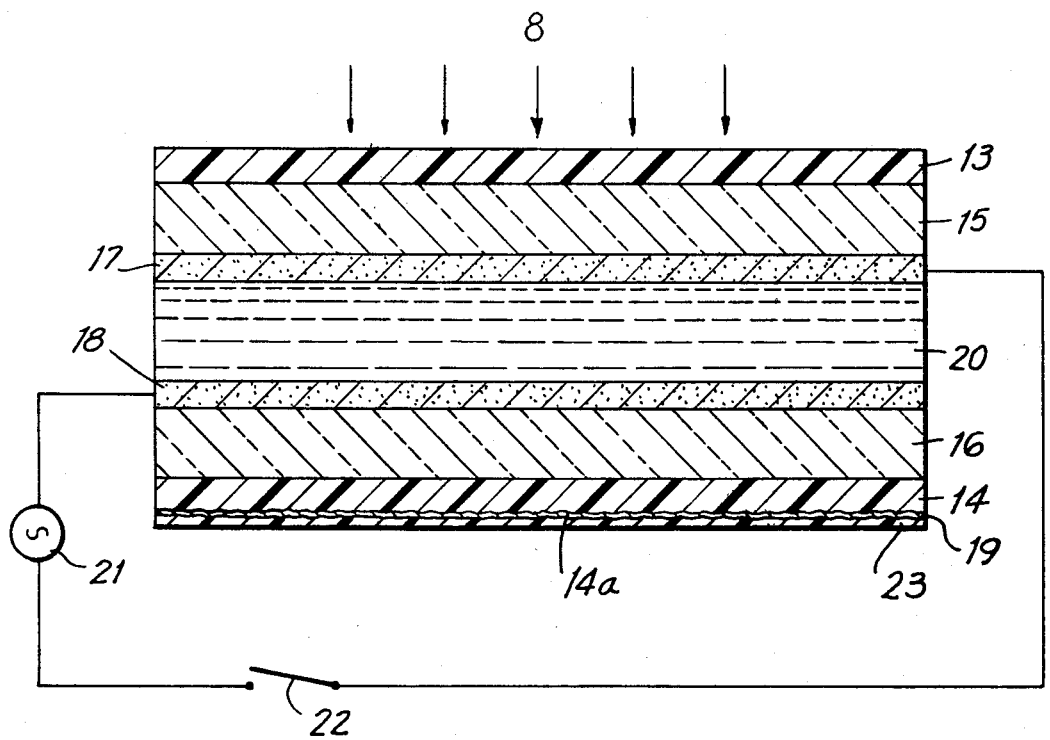
FIG. 4 is a diagrammatic view in section of a display device in accordance with the present invention.
Figure 5:
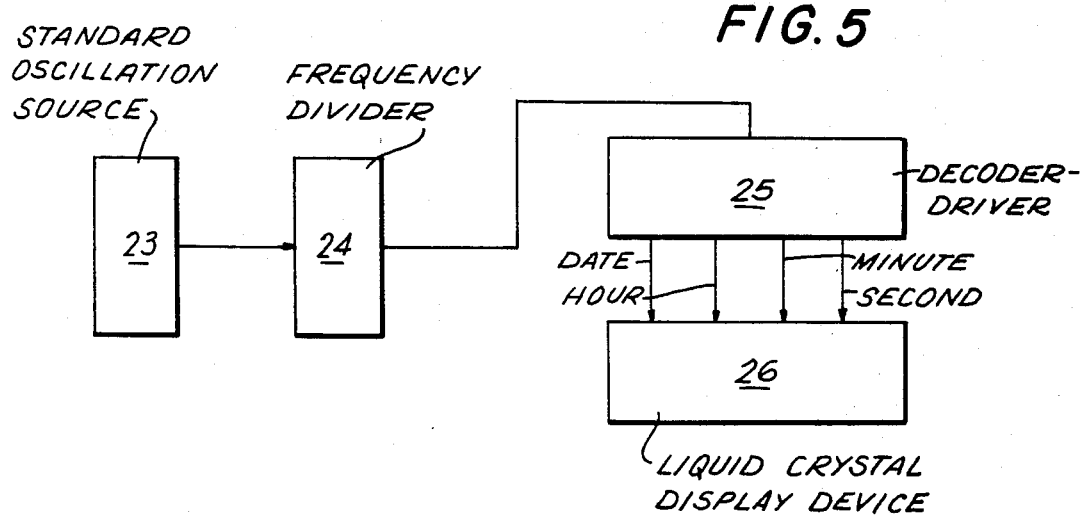
FIG. 5 is a box diagram of the circuitry of a timepiece incorporating the display device of the present invention.

FIG. 4 shows a timepiece display device in accordance with the present invention. Transparent plates 15 and 16 are provided with transparent conductive films 17 and 18. The plates, as described above, have been unidirectionally oriented and are mounted with the orientation directions perpendicular to each other. Liquid crystal material 20 is contained in the cell formed by plates 15 and 16, and in the condition shown in FIG. 4 the liquid crystal molecules immediately adjacent the plates are oriented parallel to the individual orientation directions of the plates and the molecules intermediate the plates are in the form of a quarter-turn helix having an axis perpendicular to the plane of the cell. Polarizing and analyzing filters 13 and 14 are at opposite faces of the cell. The lower, i.e., outer surface of analyzer 14 is roughened or otherwise rendered nonplanar so that it acts as a diffuser. Contiguous with the outer surface of analyzer 14 is a reflective layer 19 which is preferably of a highly reflective material such as silver, aluminum and nickel, or a white powder such as magnesium carbonate. Metal coatings can be applied by evaporation, sputtering or chemical reduction. Powder can be applied in a lacquer binder. It should be noted that there is no air gap between lower surface 14a of analyzer 14 and reflector 19, the losses by reflection which take place when light passes from a transparent solid into air and vice versa thus being avoided by the structure of the present invention.

The circuitry includes a voltage source and a switch 22.

Ambient light 8 is shown approaching the cell from the direction indicated by the arrows 8. Considering the arrangement in which the polarizing and analyzing filters 13 and 14 are mounted with crossed axes, then, in the absence of an electric field, that portion of the light which penetrates the polarizing filter 13 also traverses the cell in which it is rotated through 90° and passes through polarizing filter 14. The light strikes reflector 19 and is reflected back through the cell. In order to achieve maximum contrast as well as diffused reflection, the exterior surface 14a of analyzing filter 14 is roughened as is the contiguous reflector 19. The combination of light-scattering surface 14 and reflector 19 provides maximum contrast and maximum legibility of indicia displayed by the display device.

Block diagram 5 indicates the circuitry required for operating the display device of the present invention. Standard oscillation source 23 may include a quartz crystal vibrator or a tuning fork vibrator or an LC oscillating circuit or an RC oscillating circuit. At any rate, it provides a high frequency signal as a time standard. The signal is divided by frequency divider 24 and transmitted to decoder-driver circuit 25. From decoder-driver circuit 25, signals for seconds, minutes, and hours, and the date etc. are taken out and sent to liquid crystal display portion 26 constructed as aforenoted. The time display device in accordance with the present invention has the advantage that the liquid crystal material remains stable due to the absence of ions used in dynamic scattering mode devices. The power consumption of the timepiece liquid crystal display device of the present invention is low and the life of the liquid crystal material is high, due not only to the absence of ions but because the operating voltage is low, generally about 5 volts.

The display device of the present invention can be used in all types of timepieces such as clocks, radio timepieces, watches, etc.

It will thus be seen that the objects set forth above, among those made apparent from the preceding description, are efficiently attained, and, since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. A timepiece display device, comprising opposed unidirectionally oriented transparent plates, said plates being so positioned that said orientation directions are perpendicular to each other, at least one transparent conductive electrode on the inner surface of each of said plates, said electrodes being connectable to an external voltage source, nematic liquid crystal material of positive dielectric anisotropy between said plates, a polarizing filter at the exterior face of one of said transparent plates, an analyzing filter at the exterior surface of the other of said transparent plates, said analyzing filter having a rough exterior surface, a reflector exterior to said analyzing filter and contiguous with the rough exterior surface thereof.

2. The timepiece display device as defined in claim 1, wherein said reflector is a metal of high reflectivity.

3. The timepiece display device as defined in claim 2, wherein said metal is selected from the group consisting of silver, aluminum and nickel.

4. The timepiece display device as defined in claim 1, wherein said reflector is a powder of high reflectivity.

5. The timepiece display device as defined in claim 4, wherein said reflector is of magnesium carbonate.

6. The timepiece display device as defined in claim 1, wherein said polarization axes of said polarizing and analyzing filters are parallel to each other.

7. The timepiece display device as defined in claim 1, wherein said polarization axes of said polarizing and analyzing filters are perpendicular to each other.

* * * * *